US012602514B1

(12) United States Patent
Nair et al.

(10) Patent No.: US 12,602,514 B1
(45) Date of Patent: Apr. 14, 2026

(54) METHOD AND SYSTEM FOR PROCESSING PERSONALLY IDENTIFIABLE INFORMATION (PII) ACROSS GEOGRAPHICAL BOUNDARIES

(71) Applicant: MOENGAGE INC., San Francisco, CA (US)

(72) Inventors: Ajish Nair, Pune (IN); Yashwanth Kumar, Bangalore (IN); Nikhil Kumar, Bengaluru (IN); Shilpa Narayana Reddy, Bangalore (IN)

(73) Assignee: MOENGAGE INDIA PRIVATE LIMITED, Banglore (IN)

( * ) Notice: Subject to any disclaimer, the term of this patent is extended or adjusted under 35 U.S.C. 154(b) by 0 days.

(21) Appl. No.: 19/319,962

(22) Filed: Sep. 5, 2025

(51) Int. Cl.
*H04L 29/06* (2006.01)
*G06F 21/62* (2013.01)

(52) U.S. Cl.
CPC ................................. *G06F 21/6254* (2013.01)

(58) Field of Classification Search
CPC ............. G06F 21/6254; G06F 21/6245; G06F 21/6263; H04L 63/10; H04L 63/02; H04L 63/0263; H04L 63/107; H04L 63/1425
See application file for complete search history.

(56) References Cited

U.S. PATENT DOCUMENTS

| | | | | |
|---|---|---|---|---|
| 11,829,507 | B2 * | 11/2023 | Barber ................ | G06F 21/6227 |
| 12,210,640 | B1 | 1/2025 | Bin et al. | |
| 2018/0081672 | A1 * | 3/2018 | Hilliar ........................ | G06F 8/70 |
| 2018/0332008 | A1 * | 11/2018 | Norman .................. | H04L 67/52 |
| 2020/0076813 | A1 * | 3/2020 | Felice-Steele .......... | H04L 63/18 |
| 2021/0256522 | A1 * | 8/2021 | Dimmick ........... | G06Q 20/4014 |

* cited by examiner

*Primary Examiner* — Longbit Chai
(74) *Attorney, Agent, or Firm* — Jason A. Smith; Shumaker, Loop & Kendrick, LLP

(57) ABSTRACT

A method for processing sensitive user personally identifiable information (PII) data across geographical boundaries, including: receiving in real-time, by a personally identifiable information (PII) resolver within a first location, a payload data object from a first processing unit at a second location, wherein the payload data object comprises: a header comprising metadata, a body comprising a message to be sent to a user, and a first identifier associated with the user; determining, by the PII resolver, a second identifier and a third identifier stored in a database corresponding to the received first identifier, wherein the database includes a mapping between the first identifier, and the second identifier, and the third identifier; replacing, by the PII resolver.

17 Claims, 4 Drawing Sheets

100

PROCESSOR(S) (108)

I/O INTERFACE (S)
(110)

MEMORY (112)

102

116

Network
106

Service
Provider(s)
114

104-1

104-2

104-N

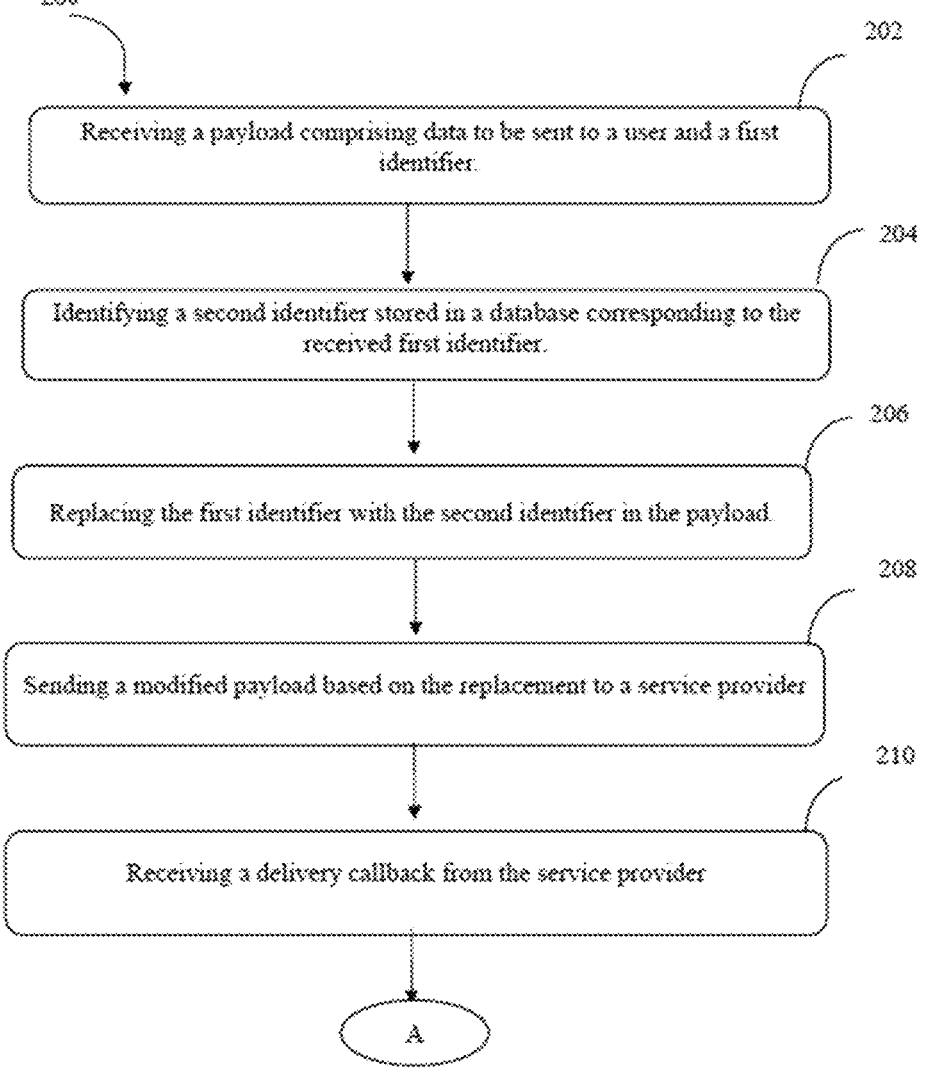

200

202

Receiving a payload comprising data to be sent to a user and a first identifier.

204

Identifying a second identifier stored in a database corresponding to the received first identifier.

206

Replacing the first identifier with the second identifier in the payload.

208

Sending a modified payload based on the replacement to a service provider

210

Receiving a delivery callback from the service provider

METHOD AND SYSTEM FOR PROCESSING PERSONALLY IDENTIFIABLE INFORMATION (PII) ACROSS GEOGRAPHICAL BOUNDARIES

PRIORITY INFORMATION

The present application does claim a priority from Indian Patent Application number 202541056592 dated Jun. 12, 2025.

TECHNICAL FILED

The present disclosure relates to data processing systems for handling sensitive user information, and more particularly to a method and system for processing personally identifiable information (PII) across geographical boundaries.

BACKGROUND

Marketing automation platforms face a complex technical challenge in processing and analysing user data across multiple geographic regions. These geographic regions may be associated with different regulations, which vary significantly between jurisdictions, often requiring personally identifiable information (PII) to be stored and processed within specific geographic boundaries. This requirement conflicts with the centralized infrastructure typically used by global marketing platforms, which rely on the ability to quickly process and analyse user data from various locations to deliver personalized content and measure campaign effectiveness. The technical problem involves developing a system that can maintain the functionality and efficiency of marketing automation services while ensuring that PII remains within mandated geographic boundaries, and that data processing complies with local regulations which may define PII differently or have specific rules for data storage, processing, and transfer.

Current solutions to this problem often involve implementing separate, localized infrastructure in each regulated region. This approach allows companies to store and process PII within the required geographic boundaries, typically by setting up data centres or using cloud services that guarantee data residency in specific locations. Some platforms also employ data segregation mechanisms, creating logical or physical separations between data sets based on geographic origin or regulatory requirements. Secure transfer protocols are implemented to manage data movement across different jurisdictions, often utilizing encryption and secure tunnelling techniques. Additionally, some solutions incorporate data anonymization or pseudonymization techniques to reduce the amount of PII that needs to be stored or processed in specific regions.

However, these solutions present significant technical and operational challenges. Maintaining separate processing capabilities in different geographic regions can lead to increased system complexity, as it requires managing multiple instances of the platform, each potentially with slight variations to comply with local laws. This complexity can result in reduced efficiency, as data and processes may need to be duplicated across regions, leading to increased latency and potential inconsistencies. The approach also incurs higher costs due to the need for redundant infrastructure and increased maintenance efforts. Additionally, the dynamic nature of data protection regulations requires constant system adaptations, making it difficult for platforms to maintain consistent functionality and performance across all markets. This ongoing need for updates can lead to version control issues and potential compliance gaps. Furthermore, the broad and sometimes ambiguous definition of PII across different jurisdictions complicates the design of systems that can comprehensively protect user data. Platforms must implement sophisticated data classification and handling mechanisms that can adapt to varying interpretations of what constitutes PII, while still enabling effective marketing automation. This challenge is compounded by the need to balance granular data control with system performance, as overly cautious data handling can negatively impact the speed and effectiveness of marketing campaigns.

SUMMARY

Before the present system(s) and method(s) are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for processing sensitive user personally identifiable information (PII) data across geographical boundaries while maintaining user PII data privacy. This summary is not intended to identify essential features of the claimed subject matter nor is it intended for use in determining or limiting the scope of the claimed subject matter.

In one implementation, a method for processing sensitive user personally identifiable information (PII) data across geographical boundaries is disclosed. The method comprises receiving in real-time, by a personally identifiable information (PII) resolver within a first location, a payload data object from a first processing unit at a second location, wherein the payload data object comprises: a header comprising metadata, a body comprising a message to be sent to a user, and a first identifier associated with the user. Further, a second identifier and a third identifier stored in a database corresponding to the received first identifier is determined by the PII Resolver. The database includes a mapping between the first identifier, and the second identifier, and the third identifier. Furthermore, by the PII resolver, the first identifier is replaced in the payload with the corresponding second identifier to generate a modified payload. Further, by the PII resolver, the modified payload, to a second processing unit is sent using the third identifier. Furthermore, a delivery callback from the second processing unit is received. The delivery call back includes: a delivery information of the modified payload and the second identifier. The second identifier is replaced with the first identifier in the received delivery call back to generate a modified delivery call back; and finally the modified delivery callback is sent to the first processing unit, wherein the modified delivery callback comprises the first identifier thereby processing the user sensitive PII data while maintaining data privacy.

In yet another implementation, a system for processing sensitive user personally identifiable information (PII) data across geographical boundaries is disclosed. The method comprises. The system comprises at least a memory sorting one or more instructions, wherein at least the memory is connected to a processor, which upon execution of the one or more instructions is configured to: receive in real-time, by a personally identifiable information (PII) resolver within a first location, a payload data object from a first processing unit at a second location, wherein the payload data object comprises: a header comprising metadata, a body comprising a message to be sent to a user, and a first identifier associated with the user. Further, a second identifier and a third identifier stored in a database corresponding to the received first identifier is determined by the PII Resolver. The database includes a mapping between the first identifier, and the second identifier, and the third identifier. Furthermore, by the PII resolver, the first identifier is replaced in the payload with the corresponding second identifier to generate a modified payload. Further, by the PII resolver, the modified payload, to a second processing unit is sent using the third identifier. Furthermore, a delivery callback from the second processing unit is received. The delivery call back includes: a delivery information of the modified payload and the second identifier. The second identifier is replaced with the first identifier in the received delivery call back to generate a modified delivery call back; and finally the modified delivery callback is sent to the first processing unit, wherein the modified delivery callback comprises the first identifier thereby processing the user sensitive PII data while maintaining data privacy.

In yet another embodiment, a system for processing sensitive user personally identifiable information (PII) data across geographical boundaries is provided. The PII resolver includes a first processor and a first memory storing first instructions. When executed by the first processor, these instructions cause the PII resolver to perform several functions. A payload comprising data to be sent to a user and a first identifier is received. A second identifier stored in a database corresponding to the received first identifier is identified, wherein the database includes a mapping between the first identifier and the second identifier, and wherein the second identifier corresponds to the PII data of the user. The first identifier is replaced with the second identifier in the payload. A modified payload based on the replacement is sent to a service provider. A delivery callback is received from the service provider, wherein the delivery callback includes delivery information of the payload and the second identifier. The second identifier is scrubbed from the delivery callback, thereby maintaining data privacy. The scrubbed delivery callback is sent to a processing entity. The system also includes the processing entity, which is located outside the geographic boundary of the regulated region. The processing entity comprises a second processor and a second memory storing second instructions. When executed by the second processor, these instructions cause the processing entity to transmit a payload comprising data to be sent to a user and a first identifier, receive the scrubbed delivery callback from the PII resolver, wherein the scrubbed delivery callback comprises the first identifier, and update a campaign status based on the scrubbed delivery callback.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for processing sensitive user personally identifiable information (PII) data in compliance with data residency regulations across geographical boundaries is disclosed in the document and the figures.

The present subject matter is described in detail with reference to the accompanying figures. In the figures, the left-most digit(s) of a reference number identify the figure in which the reference number first appears. The same numbers are used throughout the drawings to refer to various features of the present subject matter.

FIGS. 2A and 2B illustrates a method for processing sensitive user personally identifiable information (PII) data in compliance with data residency regulations across geographical boundaries while maintaining user PII data privacy, in accordance with various embodiments of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "replacing," "processing," "deleting," "mapping" "sending" "identifying" "scrubbing" and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for securely processing user sensitive personally identifiable information (PII) data. In particular, the method and system relate to processing the user's Personal Identifiable Information (PII). The PII data is highly sensitive information that is linked to individual users and can provide valuable insights to organizations striving to enhance their operations through targeted marketing and personalized services. Because standard data processing methods entail storing the PII data in databases permanently, while and after processing the PII data. Thus, the possibility of data breaches and unauthorized access remains a major concern. The system for processing Personally Identifiable Information (PII) across geographic boundaries and maintaining data privacy is required. It is vital to maintain user privacy while using PII data for different projects. The proposed technique and system, on the other hand, offer an innovative solution to these technical issues.

Figure 1:
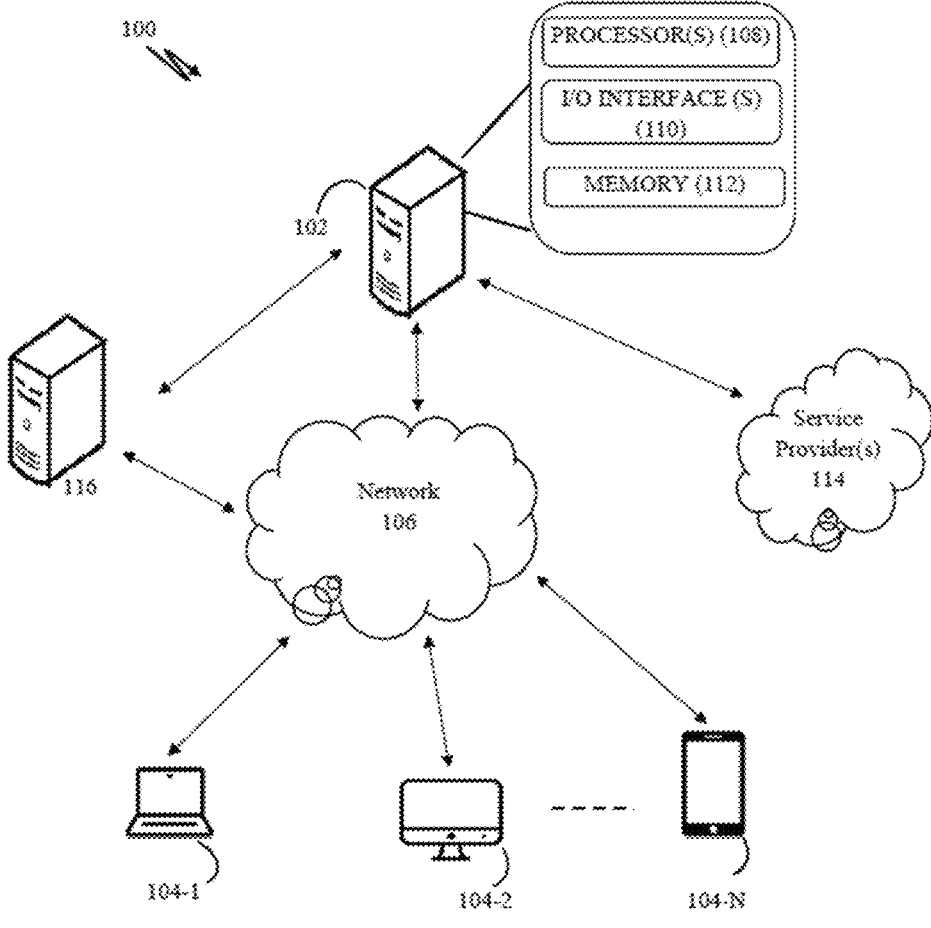
FIG. 1 illustrates a network implementation for processing sensitive user personally identifiable information (PII) data in compliance with data residency regulations across geographical boundaries while maintaining user PII data privacy, in accordance with various embodiments of the present subject matter.

Referring now to FIG. 1, a system implementation 100 for processing sensitive user personally identifiable information (PII) data in compliance with data residency regulations across geographical boundaries. The system 100 includes a PII Resolver 102, one or more user devices 104-N (for example but not limited to one or more user devices 104-1, 104-2 . . . 104-N) associated with one or more users, service provider(s) 114, and Processing Unit 116. In an embodiment the Campaign Processing Unit 116 may send a payload message to the PII Resolver 102 for transmitting the payload message to one or more users via service provider 114. To this end, the PII Resolver 102 receives the message payload and inserts the PII data of the user using a database and transmits the modified payload to the service provider 114. The data Processing Unit 116 may be associated with an entity, such as an organization, business enterprise, companies, individual users, and the like, via one or more user devices 104. In one example, in order to maintain data security, the PII data is not known to the Processing Unit 116.

Although the present disclosure is explained considering that the PII Resolver 102 is implemented on a server, it may be understood that the PII Resolver 102 may be implemented in a variety of computing systems, such as a laptop computer, a desktop computer, a notebook, a workstation, a virtual environment, a mainframe computer, a server, a network server, a cloud-based computing environment. It will be understood that the PII Resolver 102 may be in communication with the Processing Unit 116. In one implementation, the PII Resolver 102 may comprise the cloud-based computing environment in which the Processing Unit may operate individual computing systems configured to execute remotely located applications. Further, PII Resolver 102, Processing Unit 116, service provider(s) 114, user device 104 may communicate through the network 106. Examples of the user devices 104 may include, but are not limited to, a portable computer, a personal digital assistant, a handheld device, and a workstation.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the PII Resolver 102 includes at least one processor 108, an input/output (I/O) interface 110, a memory 112, and one or more modules explained later in the description. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the PII Resolver 102 to interact with the user directly or through the client devices 104. Further, the I/O interface 110 may enable the PII Resolver 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

In an embodiment, the PII Resolver 102 may interact with the service provider(s) 114 for delivering one or more messages to the user device 104. The service provider(s) 114 includes at least one of a Short Message Service (SMS) Service Provider and Email Service Provider (ESP). These services play a crucial role in the efficient delivery of messages. SMS Service Providers are telecommunications entities that manage the transmission of text messages, maintaining connections with multiple mobile network operators to ensure wide coverage. They implement protocols like SMPP (Short Message Peer-to-Peer) for high-volume message routing and offer features such as message queuing, delivery receipts, and retry mechanisms. Email Service Providers (ESPs), on the other hand, are dedicated services for high-volume email sending and management. They maintain large-scale SMTP (Simple Mail Transfer Protocol) infrastructure. These service providers are designed to handle high volumes of messages, often millions per hour, implementing load balancing and distributed architectures for reliability. In the below disclosure the service provider/vendors are referred to as processing unit, such as a second processing unit which is different from a first processing unit.

The PII Resolver 102 may be communicatively coupled with the service provider(s) 114 through the internet network 106. In an embodiment, the PII Resolver 102 may relay information to the service provider(s) 114 through the network 106. In an embodiment, the Processing Unit 116 may be implemented on a server or is a web-service, it may be understood that the Processing Unit 116 may be implemented in a variety of computing systems, such as a laptop computer, a desktop computer, a notebook, a workstation, a virtual environment, a mainframe computer, a server, a network server, a cloud-based computing environment. The Processing Unit 116 may at least be associated with one or more databases like 118 for storing data related to the user like system generated identifiers for the users. The Processing Unit 116 may include a memory, processor, transmitter, and I/O interface for data processing and transmitting data over the network 106.

In operation, the Processing unit 116 may create a payload comprising an internal identifier and message to be sent to a user, for a marketing campaign. In an example, the Processing unit may be located outside the geographic region where the PII resolver is deployed. The payload may be sent to the PII Resolver, which may resolve the internal identifier to a channel-specific identifier using its mapping database. The PII Resolver may then replace the internal identifier with the channel-specific identifier in the payload before forwarding it to the Vendor or Service provider. The Vendor may send the payload to the user and subsequently send a delivery callback to the PII Resolver. The PII Resolver may scrub the channel-specific identifier from the callback and forward the scrubbed information to the Processing unit 116, which may update the campaign status accordingly. This architecture may allow for the processing of sensitive user data outside of a geographical boundary while maintaining user data privacy and complying with data residency regulations. The PII Resolver may act as a barrier, ensuring that PII does not leave the regulated region while still enabling effective marketing automation functionality.

For example, in this scenario, the system and method significantly aid let's say a U.S.-based e-commerce company is running its summer sale campaign effectively while maintaining compliance with data regulations in the Gulf region. The PII Resolver, for example situated in Dubai, acts as a crucial intermediary that enables the company to reach its customer in the UAE without violating local data privacy laws. Firstly, the system and the method allow the U.S. company to create and manage a global campaign without directly handling sensitive customer data from different regions. They can use the internal identifier 'USER_DXB_789' to reference the Dubai-based customer, keeping their global systems free of actual PII. This approach simplifies campaign management and reduces the risk of accidentally exposing sensitive data. Secondly, the PII Resolver in Dubai ensures that the customer's email address "ahmed@example.com" never leaves the UAE. This localization of PII processing is critical for complying with data residency requirements in the Gulf region, which often mandate that personal data be stored and processed within the country's borders. Without the present system and method, the company may have been forced to either exclude UAE customers from the campaign or set up a completely separate marketing infrastructure in the UAE, both of which would be costly and inefficient solutions. Thirdly, the system and method enable the company to receive delivery confirmation and update its campaign status without ever seeing the customer's actual email address. The scrubbed callback containing only the internal identifier allows the U.S. system to track campaign performance while maintaining customer privacy. This feature is particularly valuable for analytics and reporting purposes, allowing the company to measure the success of its global campaigns without compromising data privacy. Lastly, the system and method architecture allows for real-time marketing activities despite the additional layer of data processing. The company can send timely, personalized promotions to customers in the UAE, just as they would to customers in less regulated markets. This capability ensures that the company's marketing efforts remain competitive and effective across all its global markets. In essence, this system and method helps for example, the U.S.-based e-commerce company overcome significant regulatory hurdles, enabling it to seamlessly include UAE customers in its global summer sale campaign while maintaining the security of the PII data of the UAE customer. It provides a practical solution to the challenge of balancing global marketing strategies with regional compliance requirements, ultimately allowing the company to maintain a unified marketing approach across diverse regulatory landscapes.

In an embodiment, the Personally Identifiable Information (PII) Resolver, may be a key component in maintaining data privacy and compliance with data residency regulations. In an embodiment, the PII Resolver may be deployed within the geographic boundary of a regulated region, for example within a data centre located in a Gulf Cooperation Council (GCC) country. This deployment strategy may help ensure that sensitive user data remains within the required geographical boundaries. The PII resolver may function as a gateway for sensitive user data, ensuring that personally identifiable information remains within the regulated region. In an embodiment, the PII resolver may also handle incoming data from external service providers. When receiving delivery callbacks or other information from these providers, the PII resolver may scrub any sensitive identifiers and replace them with the original non-sensitive identifiers before forwarding the information to the appropriate internal systems. The deployment of the PII resolver within a specific geographic region may allow organizations to maintain accordance with local data protection laws and regulations. This approach may enable the processing of sensitive user data on a global scale while ensuring that personally identifiable information remains within the boundaries specified by regulatory requirements.

As there are various challenges observed in the existing art, the challenges necessitate the need to build the PII Resolver 102 for processing the PII data of the user. The detailed functioning of the PII Resolver 102 is described below with the help of one or more figures.

Figure 2B:
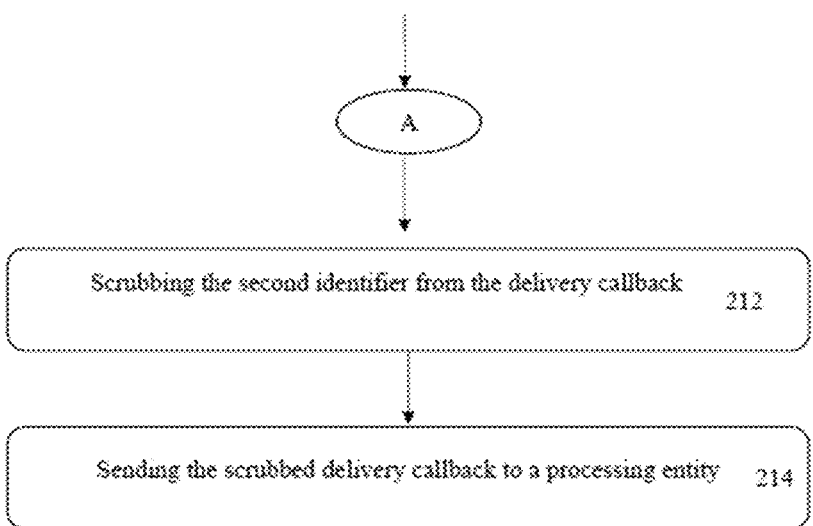

Referring now to FIG. 2, a method 200 for processing sensitive user personally identifiable information (PII) data, is shown, in accordance with one or more embodiments of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The method 200 for processing sensitive user personally identifiable information (PII) data may be implemented in any suitable hardware, software, firmware, or combination thereof. However, for ease of explanation, in the embodiments described below, the method 200 may be considered to be implemented in the system 100 of FIG. 1 by the processor(s) 108 of the PII Resolver 102 in association with the other devices in the system 100.

In an embodiment, at step 202, the PII resolver 102 may receive in real time, within the geographic boundary of a regulated region, a payload comprising data to be sent to a user and an internal identifier. For example, a payload is a data object comprising the essential information or content to be transmitted, processed, or acted upon by a system. In an example, payloads may be for marketing campaigns. These payloads may comprise various elements, including message content, targeting criteria, and internal identifiers for recipients. For example, a payload may include text of a message, date and time for when to send the message, and a list of internal identifiers representing the intended recipients. In an example, the PII resolver may receive, within the geographic boundary of a regulated region, a payload comprising the user data to be sent to a user and an internal identifier. In an embodiment, the payload comprises a header and a body. The header may comprise metadata about the payload, while the body comprises the actual content and user data. Specifically: 1. Header may include but not limited to: —Timestamp: Indicates when the payload was created—Source: Identifies the origin of the payload (e.g., "Location1" or "Location2")—Message Type: Specifies the type of message (e.g., "marketing", "transactional")—Priority: Indicates the urgency of the message (e.g., "high", "medium", "low")—Version: Specifies the version of the payload structure. 2. Body: —Content: The actual message to be sent to the user. First Identifier: The internal identifier for the user. Parameters: Any dynamic parameters to be used in the message. Scheduled Time: When the message should be sent Channel: The communication channel to be used (e.g., "email", "sms").

For example, a marketing campaign payload may include: 1. The text of an email promoting a new product launch 2. HTML formatting for the email body 3. Subject line for the email 4. Scheduled date and time for sending the message 5. List of internal customer IDs representing the intended recipients 6. Segmentation criteria (e.g., customers who made a purchase in the last 30 days) 7. Personalization tokens to be replaced with user-specific information. In another example, a transactional notification payload may comprise: 1. Template for a shipping confirmation message 2. Order number and tracking information 3. Preferred communication channel (e.g., email, SMS, push notification) 4. Customer's internal identifier 5. Language preference for the message. A customer service communication payload may include: 1. Text of a survey request 2. List of questions for the survey 3. Internal case number associated with a recent support interaction 4. Customer's internal identifier.

In an embodiment, upon receiving the payload, the PII resolver may be configured to analyse the payloads' contents to identify the component that require modification to ensure privacy compliance. The PII resolver is configured to replace non-sensitive identifiers with sensitive identifiers. For example, a body of the payload received by the PII resolver may comprise the following information: 1. User data: Marketing message content 2. internal identifier: USER123.

In an embodiment, the PII resolver receives a payload comprising information necessary for message delivery. The payload is typically structured as a JSON object, comprising key-value pairs that represent different aspects of the message and its intended recipient. For example, the payload may have the following structure: {'identifier': 'xyz', 'message': 'This is a test message', 'request_id': '1234'}

In this example payload: 1. The 'identifier' field contains the first identifier (internal identifier) that the PII resolver may use to look up the corresponding channel-specific identifier. 2. The 'message' field contains the actual content to be delivered to the recipient. 3. The 'request_id' field contains a unique identifier for this specific message request, which may be used for tracking and auditing purposes. For example, the PII resolver processes this payload by first extracting the 'identifier' value ('xyz' in this case). It then queries its secure database to find the corresponding second identifier (channel-specific identifier) and third identifier (channel type) associated with 'xyz'. After retrieving the necessary information, the PII resolver creates a modified version of the payload. In this modified version, the 'identifier' field is replaced with the channel-specific identifier. For instance, if 'xyz' corresponds to the email address 'john.doc@example.com', the modified payload may look like this: {'identifier': 'john.doc@example.com', 'message': 'This is a test message', 'request_id': '1234', 'channel': 'email'}. The PII resolver adds the 'channel' field to specify the communication method, which is derived from the third identifier in the database mapping. This modified payload is then ready to be sent to the service provider for actual message delivery, with the sensitive channel-specific identifier only exposed at this final stage of the process. In an embodiment, the original payload with the internal identifier is securely deleted from the PII resolver's memory to maintain data privacy.

In an embodiment, the internal identifier is generated by a user. The user may be an organization, a platform, a company, or an individual. The internal identifier is generated using a user interface of a mobile device or computer system. For example, the payload may be generated via the processing unit which is situated at a different location than the PII Resolver. The processing unit creates and sends the internal identifier to the PII resolver, which stores it in correspondence with the user's personal information. The internal identifier may be a random number generated using one or more pseudorandom generation algorithms. The process of generating the internal identifier involves the user interacting with a dedicated interface specifically designed for identifier creation. This interface provides tools for creating a unique identifier based on predefined criteria set by the system. Upon generation, the internal identifier is transmitted to the PII resolver for storage and association with the user's personal information. The internal identifier functions as a reference point that the PII resolver utilizes to map to the actual personal information, which is stored securely and separately. This separation ensures that the internal identifier is not directly linked to the user's personal information in a manner that would compromise privacy. The generation of the internal identifier employs one or more pseudorandom generation algorithms. These algorithms produce numbers that are deterministic but appear random, based on a defined seed value. This method ensures the uniqueness of identifiers and their resistance to prediction, thereby enhancing system security. The use of pseudorandom generation enables the creation of a large quantity of unique identifiers, which is essential for systems managing numerous users or data points. In an embodiment, the pseudorandom generation algorithm's complexity and strength are determined by the system's security requirements.

In an embodiment, at step 204, the PII resolver is configured to determine a second identifier and a third identifier corresponding to the first identifier stored in a database. The database includes a mapping between the first identifier, and the second and third identifier. In some cases, the PII resolver may query the database to find the second and third identifier that corresponds to the first identifier. This second identifier may be a sensitive, channel-specific identifier that represents the personally identifiable information. For example, the database in the PII resolver may comprise a mapping of a system-generated identifier (like USER123) to a user's email address or phone number, and a channel name like email or sms. In an example, the mapping process in the PII resolver involves a secure database that stores associations between different types of identifiers. When the resolver receives a payload containing a first identifier, it performs a lookup in this database to retrieve the corresponding second and third identifiers. This mapping is structured as, for example, key-value pairs, where the first identifier acts as the key to access the associated second and third identifiers. For instance, the database may contain entries such as: "USER123" mapped to an encrypted email address (second identifier) and "email" (third identifier), or "USER456" mapped to an encrypted phone number and "sms". When the PII resolver needs to find the second and third identifiers for "USER123", it queries the database using "USER123" as the key, which returns the corresponding encrypted email address and the channel type "email".

In an embodiment, the second identifier, which is a channel-specific identifier representing PII (such as an email address or phone number), is stored in an encrypted form in the database. For example, the PII Resolver may use a strong encryption algorithm, such as AES-256, to encrypt the channel identifier before storing it. The encryption key is securely managed using a key management service (KMS) provided by the cloud infrastructure. In an embodiment, when the PII Resolver needs to use the channel specific identifier, it first retrieves the encrypted value from the database, then decrypts it using the encryption key obtained from the KMS. In an example this decryption occurs in a runtime memory and the decrypted value is not persisted to a permanent storage, ensuring that the channel identifier remains protected at rest.

In an embodiment, to enhance security, the PII resolver may implement regular rotation of encryption keys. For example, the KMS automatically rotates the master key used to encrypt the data encryption keys on a scheduled basis (e.g., every 30 days). Additionally, the data encryption keys themselves are rotated periodically (e.g., every 90 days). During key rotation, the system re-encrypts all channel identifiers in the database with the new key. In an embodiment, access to the encrypted channel identifiers and the ability to request decryption is strictly controlled through a role-based access control (RBAC) system. Only authorized processes and personnel with specific roles are granted permission to initiate decryption requests to the KMS. In an embodiment, the API communications involve the transmission of the channel identifier (either encrypted or decrypted) using TLS 1.3 or higher for transport layer security. For example, client certificate authentication is implemented to ensure that only authorized clients may make API calls to the PII Resolver. In an embodiment where a reference to the channel specific identifier needs to be shared with external systems (including the processing entity outside the geographic boundary), a tokenization system may be employed. Instead of using the actual encrypted channel identifier, a token is generated and used as a reference. This token has no mathematical relationship to the original data, providing an additional layer of security. In an embodiment, all encryption, decryption, and key rotation operations are logged in a secure, tamper-evident audit log. This log includes information such as the timestamp of the operation, the type of operation performed, and the identity of the process or user that initiated the operation. These logs are regularly reviewed for any suspicious activities. These embodiments provide a robust security framework for protecting the channel identifier, ensuring compliance with data privacy regulations while allowing the system to function efficiently in processing PII data across geographical boundaries.

In operation, the PII Resolver may handle various types of requests while maintaining data privacy. For example, when processing a send request, the PII Resolver may receive a payload containing an internal identifier "USER123" along with message content. The PII Resolver may then query its database to find that "USER123" corresponds to the email address "example@email.com". In an embodiment, the database query executed by the PII Resolver may be a lookup operation. For example, it may be a key-value lookup where the internal identifier serves as the key, and the corresponding email address is the value being retrieved. This type of query may be implemented using, but not limited to, one of the following methods: 1. SQL Query: If the PII Resolver uses a relational database management system (RDBMS), the query may be a simple SELECT statement. For example:

SELECT email_address FROM user_mappings WHERE internal_identifier='USER123' 2. NoSQL Query: If a NoSQL database is used, such as a key-value store or document database, the query might be a direct key lookup. For instance: GET user_mappings ['USER123'] 3. In-Memory Data Structure: If the mappings are stored in an in-memory data structure for faster access, the query might be a simple hash table lookup: email_address=mapping_hash_table ['USER123'] 4. Indexed Search: For larger datasets, the database might use an indexed search to quickly locate the matching record: SEARCH user_mappings INDEX (internal_identifier) WHERE internal_identifier='USER123' The query is designed to be fast and efficient, typically with $O(1)$ or $O(\log n)$ time complexity, to ensure rapid processing of requests. The database is structured to optimize these lookups, potentially using techniques such as indexing, sharding, or caching to improve performance. In an embodiment, after executing this query, the PII Resolver retrieves the email address "example@email.com" corresponding to "USER123". The PII Resolver then replaces "USER123" with "example@email.com" in the payload before forwarding it to the appropriate service provider. This querying mechanism allows the PII Resolver to maintain a separation between internal identifiers and actual personally identifiable information, enhancing data privacy while still enabling efficient message routing and delivery.

In an embodiment, the database structure may include fields for the System Identifier, Channel Name, and Channel Identifier. For example, a table in the database may have the following structure:

| System Identifier | Channel Name | Channel Identifier |
|---|---|---|
| USER123 | Email | user@example.com |
| 9876543210 | SMS | +1234567890 |

In this structure, each row may represent a unique mapping between an internal identifier, channel name, and a channel specific identifier for a specific channel. The Channel Name field may indicate the type of communication channel, such as email or SMS, associated with the Channel Identifier. When processing a request, the PII Resolver may query this database to resolve the System Identifier to the appropriate Channel Identifier based on the specified channel. For example, if a campaign targets the email channel, the PII Resolver may look up the System Identifier in the database and retrieve the corresponding email address from the Channel Identifier field where the Channel Name is 'email'.

In an embodiment, to enhance security, the Channel Identifier information may be encrypted within the database. Various encryption methods may be employed, such as symmetric encryption using a secure algorithm like AES (Advanced Encryption Standard) or asymmetric encryption using public-key cryptography. The choice of encryption method may depend on factors such as performance requirements, key management considerations, and the specific security needs of the implementation. The database may support multiple channel types, allowing for flexible communication strategies. In addition to email and SMS, other channel types may include push notifications, in-app messages, or social media platforms. Each channel type may have its own specific format for the Channel Identifier, such as device tokens for push notifications or social media handles for platform-specific messaging. To maintain the accuracy and currency of the identifier mappings, the database may be updated regularly. In some implementations, an update mechanism may allow a system to modify or add new mappings through a secure API endpoint. This may ensure that the PII Resolver always has access to the most up-to-date identifier information for processing requests and maintaining compliance with data residency regulations.

Figure 3:
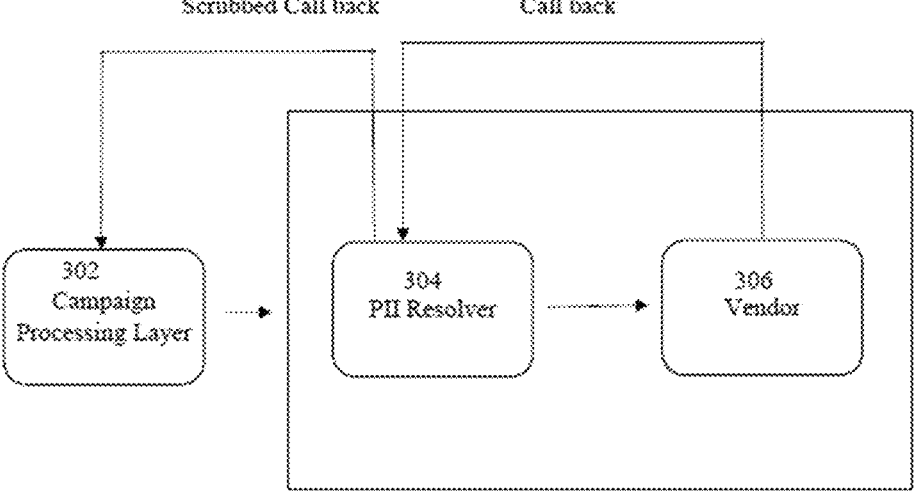
FIG. 3 illustrates interaction of one or more entities, in accordance with various embodiments of the present subject matter.

In an embodiment, as illustrated in FIG. 3, the Processing Unit 302 serves as a core component in the system for processing personally identifiable information (PII) in compliance with data residency regulations. This layer, comprising a processor and a memory storing instructions, is responsible for creating and managing payloads, such as marketing campaigns, as well as handling the processing of delivery information. The Processing Unit is typically located in a different data centre than the PII Resolver 304, often outside the geographic boundaries where the PII Resolver is deployed. The Processing Unit creates payloads like marketing campaigns and interacts with the PII Resolver through API calls. When a campaign is ready for execution, the Processing Unit executes instructions to send the payload to the PII Resolver's Send endpoint. This interaction involves transmitting the payload data along with necessary authentication or authorization information to ensure secure communication between components. The PII Resolver, also equipped with a processor and memory storing specific instructions, replaces the identifier in the payload with user-sensitive information like an email address or phone number and sends it to the Vendor 306. This process is referred to as resolved identifier replacement, where the initial identifier is substituted with a second identifier by the PII Resolver. After sending a payload to the PII Resolver, the Processing Unit awaits delivery callbacks. The Vendor 306 then calls back the PII Resolver with the resolved identifier, which is again replaced by the PII Resolver with the initial identifier before sharing it with the Processing Unit 302. The replacement of the resolved identifier with the initial identifier is called scrubbing. These callbacks are received through a designated endpoint within the Processing Unit. The callbacks contain information about the delivery status of messages sent as part of the campaign along with the initial identifier. The Processing Unit then executes instructions to update campaign status based on these scrubbed delivery callbacks.

In an embodiment, at step 306, the PII resolver replaces the first identifier (internal identifier) with the second identifier (channel specific identifier) in the payload to generate a modified payload. The PII resolver executes this replacement process securely and efficiently within its protected environment. The PII resolver locates the first identifier within the payload structure, parsing JSON or XML formats as necessary. The PII resolver retrieves the corresponding encrypted second identifier from its secure database and decrypts it using a key obtained from the Key Management Service (KMS), performing this operation in isolated memory.

In an embodiment, the PII resolver performs the replacement of the first identifier with the second identifier in the payload to generate a modified payload. For the given example payload: {'identifier': 'xyz', 'message': 'This is a test message', 'request_id': '1234'}. In an embodiment, the PII resolver executes the following steps: 1. The PII resolver extracts the first identifier 'xyz' from the 'identifier' field of the payload. 2. The PII resolver queries its secure database to find the corresponding second identifier (channel-specific identifier) for 'xyz'. 3. Upon successful lookup, the PII resolver retrieves the second identifier, which in this example is the phone number '986XXXX'. 4. The PII resolver then creates a modified payload by replacing the entire string 'xyz' with '986XXXX' in the 'identifier' field. The resulting modified payload becomes: {'identifier': '986XXXX', 'message': 'This is a test message', 'request_id': '1234'}.

In this process, the PII resolver replaces the first identifier as a whole string, maintaining the structure of the payload while swapping out the identifier used for downstream processing and message delivery. The replacement is performed securely within the PII resolver's protected environment, ensuring that the sensitive channel-specific identifier is only inserted into the payload just before transmission to the service provider. This approach allows the system to work with anonymized identifiers (like 'xyz') in most of its operations, only resolving to actual contact information (like '986XXXX') when necessary for message delivery, thereby enhancing data privacy and security. In an embodiment, the same process may be followed while replacing the actual contact information with the anonymized or internal identifier.

In an embodiment, The PII Resolver creates a copy of the original payload and performs the replacement operation on this copy, leaving the original payload intact. This approach allows for easier rollback and maintains a clear separation between the input and output data. For example, with an original payload of {"user_id": "USER123", "message": "Hello"}, the PII Resolver creates a copied and modified payload of {"user_id": "john.doc@example.com", "message": "Hello"}. The PII resolver replaces the first identifier with the decrypted second identifier in the appropriate field of the copied payload. To maintain data integrity, the PII resolver adds metadata indicating the replacement, including a timestamp and transaction ID. The PII resolver adds a field such as {"replacement_info": {"timestamp": "2023-04-11T14:30:00Z", "transaction_id": "TX12345"}}. In an example, the PII resolver securely deletes the original payload containing the first identifier from memory to prevent any potential data leakage. Before sending the modified payload, the PII resolver performs a final validation check to ensure the second identifier is correctly formatted for the specified channel (e.g., valid email address format for email channel, or valid phone number for SMS). In an embedment, the PII resolver may not create a copy and perform all the above discussed operations in the received payload only. This process ensures that the PII resolver only decrypts and inserts the sensitive, channel-specific identifier into the payload just before transmission, minimizing exposure risk while maintaining the payload's structure and integrity for downstream processing and message delivery. By working with a copy of the payload, the PII resolver maintains flexibility and can easily revert to the original data if needed, enhancing the robustness and reliability of the identifier replacement process. In an embodiment, at step 208, the PII Resolver may be configured to send a modified payload based on the replacement, to a service provider. In an embodiment the service provider is a processing unit which is different from the processing unit that creates and sends the payload. For example, once the payload has been modified, the PII resolver may employ various protocols to send the transformed data to the appropriate service provider. In an embodiment, the PII Resolver may use RESTful APIs, where the resolver constructs an HTTP POST request comprising the modified payload. In an embodiment, the PII resolver includes one or more authentication tokens and sets appropriate headers to ensure the payload is correctly interpreted by the receiving system. In yet another embodiment, the PII resolver may employ SOAP web services. In this case, the modified payload is wrapped in a SOAP envelope, complete with the required headers for authentication and metadata. This approach allows the PII resolver to interact with a wide range of enterprise systems that may still rely on SOAP for their communications. In an embodiment, the service provider may be located outside the regulated region where the PII resolver is deployed. This arrangement may allow for efficient data processing and delivery while ensuring compliance with data privacy regulations. Upon receiving the modified payload, the service provider may perform various operations on the user data. These operations may include sending messages, analysing engagement, or updating user records. The service provider may carry out these tasks without having access to the original personally identifiable information, as the payload contains only non-sensitive identifiers.

After processing the payload, the service provider may generate a delivery callback to report on the status and outcome of the operation. The delivery callback may be sent back to the PII resolver, comprising information about the delivery and the sensitive identifier associated with the user, which was the channel specific identifier. The delivery callback may include various types of delivery information. In an embodiment, this information may comprise: 1. Delivery status: This may indicate whether the payload was successfully delivered, pending, or failed. For example, the status may be 'delivered,' 'bounced,' or 'queued.' 2. Timestamp: The delivery callback may include a timestamp indicating when the delivery attempt was made or when the status was last updated. 3. Engagement metric: In some cases, the callback may comprise information about user engagement with the delivered content. This may include metrics such as 'opened,' 'clicked,' or 'unsubscribed.'

For example, a delivery callback received by the PII resolver, at step 210, from the service provider may look like this: "'{"status": "delivered", "timestamp": "2025-04-11T14:30:00Z", "engagement": "opened", "identifier": "978xxxxxx (mobile number)"}'". In this example, the delivery callback indicates that the payload was successfully delivered, the delivery occurred at the specified timestamp, the user opened the message, and the sensitive identifier associated with the user is "978xxxxxx (mobile number)". Upon receiving the delivery callback, at step 212, the PII resolver may process the information to maintain user privacy before forwarding it to internal systems. This processing may involve scrubbing the sensitive identifier from the callback and replacing it with the original, at step 214, non-sensitive (internal identifier) identifier. By facilitating this interaction between the PII resolver and the service provider, the system may enable the processing of sensitive user data outside of geographical boundaries while maintaining user data privacy and complying with data protection regulations.

This may be illustrated with the help of following example: In an embodiment, the PII resolver performs the following steps for handling and processing a delivery callback 1. Receiving the delivery callback: The PII resolver receives a delivery callback from the second processing unit may be a service provider/vendor. This callback contains information about the delivery status of the payload and includes the second identifier (channel-specific identifier) that was used for the delivery. Example callback received: {"delivery_status": "delivered", "timestamp": "2023-04-11T15:30:00Z", "recipient": "john.doc@example.com", "message_id": "MSG123456" 2. Parsing the callback: The PII resolver parses the received callback to extract the relevant information, including the delivery information and the second identifier. 3. Identifying the second identifier: The PII resolver identifies the field containing the second identifier in the callback. In this example, it's the "recipient" field. 4. Querying the database: The PII resolver queries its secure database to find the corresponding first identifier (internal identifier) for the given second identifier. Database query: SELECT first_identifier FROM mapping_table WHERE second_identifier='john.doc@example.com' Result: first_identifier: "USER123" 5. Replacing the identifier: The PII resolver creates a new version of the callback, replacing the second identifier with the first identifier. Generating Modified callback: {"delivery_status": "delivered", "timestamp": "2023-04-11T15:30:00Z", "recipient": "USER123", "message_id": "MSG123456"} 6. Validation and security measures: The PII resolver performs a final check to ensure the replacement was successful and that no sensitive information remains in the modified callback. 7. Preparing for forwarding: The PII resolver prepares the modified callback for forwarding to the appropriate internal systems or the first processing unit. This process enables the PII resolver to maintain data privacy by ensuring that sensitive, channel-specific identifiers (like email addresses) are not propagated beyond the necessary point in the system. Instead, internal identifiers are used for all subsequent processing and storage, reducing the risk of exposing personally identifiable information. The PII resolver accomplishes this task efficiently by leveraging its secure database for quick lookups and by performing all operations in a protected memory space. This approach allows for real-time processing of callbacks while maintaining strict privacy and security standards.

In an embodiment, the PII Resolver operates as a flexible intermediary capable of handling various payload formats and callback structures from different vendors. The system is designed to accommodate both predefined vendor formats and custom vendor integrations. For predefined vendor integrations, for example with Vendor A and Vendor B, which are major players in the lets say mobile messaging industry, the PII Resolver has built-in knowledge of their specific callback formats. When receiving callbacks from these vendors, the PII Resolver automatically recognizes the structure and knows precisely where to locate the channel-specific identifier (e.g., mobile number) for scrubbing. For example, Vendor A may return callbacks in a JSON format where the mobile number is located at "response.recipient.phoneNumber", while Vendor B may use an XML format with the mobile number in an element named "destination_address". The PII Resolver is pre-configured to parse these known formats efficiently. To support a wider range of vendors, the PII Resolver also implements a flexible configuration system for custom vendor integrations. This system allows new vendors to define their callback contract, specifying the exact location of sensitive information within their response structure. For instance, a vendor may indicate that the mobile number is found at "body.mobileNumber" in their JSON response. The PII Resolver stores these vendor-specific configurations in a secure, version-controlled repository. When processing a callback, the system first identifies the vendor, then retrieves the appropriate configuration to correctly parse and scrub the response. For outgoing payloads, the PII Resolver similarly adapts to vendor-specific requirements. It may transform the internal payload format into the structure expected by each vendor. This could involve reorganizing data fields, adding vendor-specific headers, or encoding the payload in a particular format (JSON, XML, or custom formats). The PII Resolver may also implement a protocol negotiation step when establishing connections with vendors. This allows the system to dynamically adjust its communication protocol based on what the vendor supports, which may include REST, SOAP, gRPC, or other protocols. To handle varying data volumes and ensure scalability, the PII Resolver employs a queue-based system for processing both incoming and outgoing messages. This allows the system to manage traffic spikes and ensure reliable delivery even when dealing with high-volume vendors. For security, all communications between the PII Resolver and vendors are encrypted using TLS 1.2 or higher. The system may also support mutual TLS authentication for vendors requiring heightened security measures. In cases where vendors update their APIs or callback formats, the PII Resolver includes a version management system. This allows the system to handle multiple versions of a vendor's integration simultaneously, ensuring backward compatibility while gradually transitioning to newer formats. By maintaining this flexible, configurable approach, the PII Resolver can efficiently handle a diverse ecosystem of vendors and payload formats while consistently enforcing data privacy and residency requirements.

In an embodiment, after scrubbing the delivery callback, at step 214, the PII resolver may send the modified callback to the original processing unit. In an embodiment, the processing unit may be a campaign processing layer of the system, which may be located outside the geographic region where the PII resolver is deployed. In an embodiment, this is the same processing unit which sends the payload to the PII resolver, as discussed in FIG. 2 in detail. The scrubbed delivery callback sent to the processing entity may comprise the following information: 1. Delivery status (e.g., delivered, bounced, pending) 2. Timestamp of the delivery attempt or status update 3. Engagement metrics (e.g., opened, clicked, unsubscribed) 4. Original sensitive identifier (e.g., email address or phone number)

By providing this information to the processing unit, the system may enable the tracking and analysis of for example, campaign performance while maintaining user data privacy. The processing entity may use the scrubbed delivery callback to update campaign status, measure engagement rates, or trigger follow-up actions based on the delivery outcomes. In an embodiment, the processing entity may store or process the information from the scrubbed delivery callback without retaining the sensitive identifier. This approach may further enhance data privacy by limiting the exposure of personally identifiable information within the system.

The scrubbing and forwarding of delivery callbacks by the PII resolver may create a privacy-preserving bridge between external service providers and internal processing systems. This mechanism may allow organizations to leverage global data processing capabilities while complying with data protection regulations and maintaining the privacy of user information. The processing entity may play a crucial role in handling campaign-related tasks within the system. In some cases, the processing entity may be a campaign processing layer of the system, which may be located outside the geographic region where the personally identifiable information (PII) resolver is deployed. This arrangement may allow for efficient campaign management while maintaining compliance with data privacy regulations. Upon receiving the scrubbed delivery callback from the PII resolver, the processing entity may utilize the information to update the campaign status. The scrubbed delivery callback may contain valuable data such as delivery status, timestamp, engagement metrics, and the original sensitive identifier associated with the user.

In an embodiment, the PII Resolver may expose several API endpoints to facilitate its functionality. In an embodiment, these endpoints may include a Send endpoint, a Callback endpoint, and an Update endpoint. The Send endpoint may receive payload messages from other system components, such as a campaign processing layer. These payloads may contain internal identifiers that need to be resolved to channel-specific identifiers. Upon receiving a request, the PII Resolver may query its database to find the corresponding channel-specific identifier, replace the internal identifier in the payload with the channel-specific identifier, and then forward the modified payload to a vendor URL. The Callback endpoint may handle delivery callbacks from vendors. When a vendor sends a callback containing delivery information and a channel-specific identifier, the PII Resolver may process this information. In some implementations, the PII Resolver may scrub the channel-specific identifier from the callback, replacing it with the corresponding internal identifier before forwarding the callback to other system components. The Update endpoint may allow for the maintenance and updating of the identifier mappings stored in the PII Resolver's database. This endpoint may function similarly to a server-to-server (S2S) API, enabling clients to keep their identifier information up to date.

In an embodiment, the system for processing sensitive user personally identifiable information (PII) data incorporates an auto-scaling mechanism to efficiently handle varying volumes of data and requests. This auto-scaling system is implemented using cloud infrastructure services, for example as those provided by Amazon Web Services (AWS). The PII Resolver and the Processing Unit (Campaign Processing Layer) are deployed as scalable services within their respective geographic regions. Each component is configured with auto-scaling groups that automatically adjust the number of instances based on predefined metrics and triggers. For the PII Resolver, for example, but not limited to: 1. CPU Utilization Trigger: When the average CPU utilization across PII Resolver instances exceeds 70% for a sustained period (e.g., 5 minutes), additional instances are automatically provisioned to handle the increased load. 2. Request Count Trigger: If the number of incoming requests per minute surpasses a threshold (e.g., 1000 requests/minute), the auto-scaling group initiates the launch of new instances. 3. Memory Usage Trigger: High memory usage (e.g., over 80% for 10 minutes) triggers the creation of new instances to prevent performance degradation. For the Campaign Processing Layer, for example, but not limited to: 1. Queue Length Trigger: As the number of pending campaign requests in the processing queue grows beyond a set threshold, new instances are spun up to process the backlog more quickly. 2. Time-based Scaling: During known peak periods (e.g., holiday seasons), the system proactively scales up to handle anticipated increased load. Both components also have scale-down policies to reduce instances when the load decreases, ensuring cost-efficiency: 1. Low CPU Utilization: When average CPU usage falls below 30% for an extended period (e.g., 15 minutes), unnecessary instances are terminated. 2. Request Count Decrease: If the incoming request rate drops significantly below the threshold for scaling up, instances are gradually removed. The auto-scaling system is complemented by a comprehensive monitoring and alerting framework. Cloud-Watch alarms are set up to monitor various metrics such as error rates, latency, and resource utilization. These alarms can trigger notifications to system administrators and initiate automated remediation actions when predefined thresholds are breached. Additionally, the system employs predictive scaling, which may use machine learning to forecast load and proactively adjust capacity. This feature analyses historical data patterns to anticipate future demand and scales the infrastructure, accordingly, ensuring optimal performance during predictable traffic spikes. In an embodiment, load balancers may be implemented in front of both the PII Resolver and Campaign Processing Layer to distribute incoming requests evenly across all available instances, further enhancing the system's ability to handle high volumes efficiently. This auto-scaling architecture ensures that the system can dynamically adapt to changing workloads, maintaining performance and data privacy compliance while optimizing resource utilization and operational costs. The ability to automatically scale up during high-demand periods and scale down during quieter times allows the system to efficiently process large volumes of sensitive data across geographical boundaries while adhering to data residency regulations.

In an embodiment, the processing unit (Campaign Processing Layer) may perform one or more operations to update the campaign status based on the information received in the scrubbed delivery callback. These operations may include: 1. Tracking delivery rates: The processing unit may update the overall delivery success rate for the campaign based on the delivery status information in the callback. 2. Monitoring engagement: The processing unit may analyse engagement metrics to assess the effectiveness of the campaign. This may involve updating metrics such as open rates, click-through rates, or unsubscribe rates. 3. Identifying trends: By processing multiple callbacks over time, the processing entity may identify trends in user behaviour or delivery performance, which may inform future campaign strategies. 4. Triggering follow-up actions: Based on the delivery status or engagement metrics, the processing unit may initiate follow-up actions such as resending messages to users with failed deliveries or sending additional content to highly engaged users. For example, upon receiving a scrubbed delivery callback indicating successful delivery and message opening, the processing entity may update the campaign status as follows: 1. Increment the count of successfully delivered messages 2. Update the open rate for the campaign 3. Mark the specific user as engaged 4. Schedule a follow-up message for the engaged user In another example, if the scrubbed delivery callback indicates a failed delivery, the processing unit may: 1. Increment the count of failed deliveries 2. Update the bounce rate for the campaign 3. Flag the user's contact information for verification or removal from future campaigns 4. Trigger an alert to the campaign manager if the failure rate exceeds a certain threshold. By processing the scrubbed delivery callbacks and updating the campaign status, the processing entity may enable effective campaign management and optimization while maintaining user data privacy. This approach may allow organizations to leverage data-driven insights for their marketing efforts without compromising the security of personally identifiable information. The system for processing sensitive user data outside of geographical boundaries while maintaining user data privacy may be designed to address various data residency regulations and compliance requirements across different jurisdictions. In an embodiment, the deployment of system components may be strategically planned to ensure adherence to specific regional data protection laws.

Data residency regulations may require that certain types of personally identifiable information (PII) remain within the borders of a particular country or region. In some cases, these regulations may mandate that PII be stored and processed only within the geographical boundaries of the jurisdiction where the data originated. To comply with such regulations, the personally identifiable information (PII) resolver may be deployed within data centres located in specific geographic regions. This deployment strategy may allow organizations to maintain control over sensitive user data and ensure that PII remains within the required geographical boundaries. For example, in some cases, the European Union's General Data Protection Regulation (GDPR) may require that personal data of EU citizens be processed within the EU or in countries with adequate data protection measures. To address this requirement, the PII resolver may be deployed in data centres within EU member states, ensuring that the processing of EU citizens' PII occurs within the designated geographical boundaries.

Similarly, other countries or regions may have their own data residency requirements. In some cases, countries like Russia, China, or Brazil may have laws mandating that certain types of personal data be stored and processed within their national borders. The system architecture may allow for the deployment of PII resolvers in data centres within these countries to comply with their specific regulations. The system's architecture may enable compliance with data residency regulations by implementing a distributed network of PII resolvers. In some cases, each PII resolver may be responsible for handling the sensitive user data originating from its designated geographical region. This approach may allow for the localization of PII processing while still enabling global data operations. To further enhance compliance with data protection regulations, the system may implement data minimization techniques. In an embodiment, the PII resolver may transform sensitive identifiers into non-sensitive alternatives before sending data outside the regulated region. This transformation may reduce the risk of exposing personally identifiable information during cross-border data transfers.

The channel-specific identifiers used by the personally identifiable information (PII) resolver may take various forms depending on the communication channels and data types involved. In some cases, these identifiers may include: 1. Hashed email addresses: The system may use cryptographic hash functions to generate unique, non-reversible identifiers based on user email addresses. 2. Tokenized phone numbers: Phone numbers may be replaced with randomly generated tokens that serve as temporary identifiers for specific campaigns or time periods. 3. Device-specific identifiers: For mobile applications or IoT devices, the system may utilize device IDs or other unique hardware identifiers as non-sensitive alternatives to personal information. 4. Social media handles: In cases where the system interfaces with social media platforms, anonymized versions of user handles or account IDs may be used as channel-specific identifiers. 5. Federated identity tokens: The system may integrate with federated identity providers to use temporary, revocable tokens as identifiers across multiple services or platforms.

In an embodiment, the system may be adapted for use in specific industries with unique data handling requirements. For example: 1. Healthcare: The system may be modified to handle protected health information (PHI) in compliance with regulations such as HIPAA. This may involve additional encryption layers or specialized data transformation techniques for medical records and patient identifiers. 2. Financial services: For applications in banking or insurance, the system may incorporate features to handle sensitive financial data, such as account numbers or credit scores, while complying with industry-specific regulations like PCI DSS or GLBA. 3. Education: In educational settings, the system may be adapted to process student data in accordance with regulations like FERPA, implementing specific safeguards for academic records and student identifiers. 4. E-commerce: For online retail applications, the system may be extended to handle transaction data and purchase histories while maintaining customer privacy across multiple sales channels and geographical regions.

In an embodiment, the system may also incorporate additional features to enhance its capabilities and address evolving privacy concerns: 1. Consent management: In some cases, the system may include a module for managing user consent preferences, allowing individuals to control how their data is processed and shared across different channels and jurisdictions. 2. Data retention policies: The system may implement configurable data retention policies, automatically purging or anonymizing data after specified periods to comply with various regulatory requirements. 3. Audit trails: To enhance accountability and demonstrate compliance, the system may maintain detailed audit logs of all data processing activities, including access requests, modifications, and transfers. 4. Multi-factor authentication: The system may incorporate additional security measures, such as multi-factor authentication, for accessing sensitive components like the PII resolver or the identifier mapping database. 5. Encryption key rotation: In some cases, the system may implement automatic encryption key rotation to enhance security and reduce the risk of unauthorized access to sensitive data. 6. Data subject access request (DSAR) automation: The system may include features to automate the handling of data subject access requests, facilitating compliance with privacy regulations that grant individuals the right to access, correct, or delete their personal information. 7. Cross-border data transfer mechanisms: To address evolving regulations on international data transfers, the system may incorporate features such as standard contractual clauses or binding corporate rules to ensure lawful cross-border data flows. 8. Privacy-enhancing technologies: The system may integrate advanced privacy-enhancing technologies such as homomorphic encryption or secure multi-party computation, allowing for data analysis and processing without exposing raw personal information. By incorporating these variations and additional features, the system may be adapted to meet the specific needs of different industries and use cases while maintaining its core functionality of processing sensitive user data across geographical boundaries in a privacy-preserving manner.

Although implementations for methods and systems for processing Personal Identifiable Information (PII) data have been described in language specific to structural features and/or methods, it is to be understood that the appended claims are not necessarily limited to the specific features or methods described. Rather, the specific features and methods are disclosed as examples of implementations for processing Personal Identifiable Information (PII) data.

The invention claimed is:

1. A method for processing sensitive user personally identifiable information (PII) data across geographical boundaries, comprising:

receiving in real-time, by a personally identifiable information (PII) resolver within a first location, a payload data object from a first processing unit of a business enterprise entity at a different second location, wherein the payload data object comprises: a header comprising metadata, a body comprising a message to be sent to a user, and a first identifier associated with the user;

determining, by the PII resolver, a second identifier and a third identifier stored in a database corresponding to the received first identifier, wherein the database includes a mapping between the first identifier, and the second identifier, and the third identifier;

replacing, by the PII resolver, the first identifier in the payload data object with the corresponding second identifier to generate a modified payload;

sending using the third identifier, by the PII resolver, the modified payload, to a second processing unit of a service provider;

receiving, by the PII resolver, a delivery callback message from the second processing unit of the service provider, wherein the delivery call back message includes: a delivery information of the modified payload and the second identifier;

replacing, by the PII resolver, the second identifier with the first identifier of the user in the received delivery call back message to generate a modified delivery call back message; and sending, by the PII resolver, the modified delivery callback message to the first processing unit of the business enterprise entity, wherein the modified delivery callback message comprises the replaced first identifier thereby processing the user sensitive PII data while maintaining data privacy across the geographical boundaries as well as causing the first processing unit of the business enterprise entity to update a campaign status based on the modified delivery callback.

2. The method of claim 1, wherein the second processing entity is located in the first location.

3. The method of claim 1, wherein the second processing entity is located in a third location.

4. The method of claim 1, wherein the second identifier is a channel-specific identifier representing PII, and wherein the channel-specific identifier represents at least one of an email address or a phone number.

5. The method of claim 1, wherein the second identifier is a channel name via which the payload is sent.

6. The method of claim 1, wherein the delivery information includes at least one of a delivery status, a timestamp, or an engagement metric.

7. The method of claim 1, further comprising:

updating, by the first processing entity, a campaign status based on the modified delivery callback.

8. The method of claim 1, wherein the method further comprises:

encrypting the second identifier using an encryption algorithm before storing the second identifier in the database; and storing an encrypted version of the second identifier in the database.

9. A system for processing sensitive user personally identifiable information (PII) data across geographical boundaries, comprising:

a personally identifiable information (PII) resolver deployed within a geographic boundary of a regulated region, the PII resolver comprising:

a processor device;

a memory storing instructions that, when executed by the processor device, cause the PII resolver to:

receive in real-time, by a personally identifiable information (PII) resolver within a first location, a payload data object from a first processing unit of a business enterprise entity at a different second location, wherein the payload data object comprises: a header comprising metadata, a body comprising a message to be sent to a user, and a first identifier associated with the user;

determine, by the PII resolver, a second identifier and a third identifier stored in a database corresponding to the received first identifier, wherein the database includes a mapping between the first identifier, and the second identifier, and the third identifier;

replace, by the PII resolver, the first identifier in the payload data object with the corresponding second identifier to generate a modified payload;

send using the third identifier, by the PII resolver, the modified payload, to a second processing unit of the service provider;

receive, by the PII resolver, a delivery callback message from the second processing unit, wherein the delivery call back message includes: a delivery information of the modified payload and the second identifier;

replace, by the PII resolver, the second identifier with the first identifier of the user in the received delivery call back message to generate a modified delivery call back message; and send, by the PII resolver, the modified delivery callback message to the first processing unit of the business enterprise entity, wherein the modified delivery callback message comprises the replaced first identifier thereby processing the user sensitive PII data while maintaining data privacy across the geographical boundaries as well as causing the first processing unit of the business enterprise entity to update a campaign status based on the modified delivery callback.

10. The system of claim 9, wherein the second processing entity is located in the first location.

11. The system of claim 9, wherein the second processing entity is located in a third location.

12. The system of claim 9, wherein the second identifier is a channel-specific identifier representing PII, and wherein the channel-specific identifier represents at least one of an email address or a phone number.

13. The system of claim 12, wherein the first processing entity comprises:

a processor;

a memory storing instructions that, when executed by the processor, cause the processing entity to:

update a campaign status based on the modified delivery callback.

14. The system of claim 9, wherein the second identifier is a channel name via which the payload is sent.

15. The system of claim 9, wherein the delivery information includes at least one of a delivery status, a timestamp, or an engagement metric.

16. A system for processing sensitive user personally identifiable information (PII) data across geographical boundaries, comprising:

a personally identifiable information (PII) resolver deployed in a first location, the PII resolver comprising:

a first processor device;

a first memory storing first instructions that, when executed by the first processor device, cause the PII resolver to:

receive in real-time, by the personally identifiable information (PII) resolver within the first location, a payload data object from a first processing unit of a business enterprise entity at a different second location, wherein the payload data object comprises: a header comprising metadata, a body comprising a message to be sent to a user, and a first identifier associated with the user;

determine, by the PII resolver, a second identifier and a third identifier stored in a database corresponding to the received first identifier, wherein the database includes a mapping between the first identifier, and the second identifier, and the third identifier;

replace, by the PII resolver, the first identifier in the payload data object with the corresponding second identifier to generate a modified payload;

send using the third identifier, by the PII resolver, the modified payload, to a second processing unit of the service provider;

receive, by the PII resolver, a delivery callback message from the second processing unit, wherein the delivery call back message includes: a delivery information of the modified payload and the second identifier;

replace, by the PII resolver, the second identifier with the first identifier of the user in the received delivery call back message to generate a modified delivery call back message; and send, by the PII resolver, the modified delivery callback message to the first processing unit of the business enterprise entity, wherein the modified delivery callback message comprises the replaced first identifier thereby processing the user sensitive PII data while maintaining data privacy across the geographical boundaries; and the first processing unit comprising:

a second processor device;

a second memory storing second instructions that, when executed by the second processor device, cause the first processing unit to:

transmit the payload data object to the PII Resolver;

receive the modified delivery callback from the PII resolver, wherein the modified delivery callback comprises the first identifier of the user; and update a campaign status based on the modified delivery callback.

17. The system of claim 9, wherein the PII resolver is further configured to:

encrypt the second identifier using an encryption algorithm before storing the second identifier in the database; and store an encrypted version of the second identifier in the database.

* * * * *